US009510153B2

(12) United States Patent
Tanabe et al.

(10) Patent No.: US 9,510,153 B2
(45) Date of Patent: Nov. 29, 2016

(54) HANDOFF BETWEEN ACCESS POINTS FOR A MOBILE ELECTRONIC DEVICE BASED ON MOBILITY STATE

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/923,375

(22) Filed: Oct. 26, 2015

(65) Prior Publication Data
US 2016/0050539 A1    Feb. 18, 2016

Related U.S. Application Data

(63) Continuation of application No. PCT/JP2014/061602, filed on Apr. 24, 2014.

(30) Foreign Application Priority Data

Apr. 26, 2013  (JP) ................................. 2013-093788

(51) Int. Cl.
*H04W 4/02* (2009.01)
*H04W 52/02* (2009.01)
*H04W 8/22* (2009.01)

(52) U.S. Cl.
CPC ......... *H04W 4/027* (2013.01); *H04W 52/0254* (2013.01); *H04W 8/22* (2013.01)

(58) Field of Classification Search
CPC ...... H04W 4/027; H04W 8/028; H04W 8/22
See application file for complete search history.

(56) References Cited

U.S. PATENT DOCUMENTS 7,260,399 B1 * 8/2007 Oh ........................ H04W 36/24
370/331
8,712,723 B1 * 4/2014 Kahn ..................... G01B 21/02
377/24.2

(Continued)

OTHER PUBLICATIONS

Partial English translation of: Yoshiki Okochi et al. "Okunai Sokui no Tameno Hoko Pattern Sutei" Information Processing Society of Japan 2013, Mar. 6, 2013, pp. 3-143 to 3-144, previously submitted for consideration in an IDS filed with the USPTO.

(Continued)

*Primary Examiner* — Vladimir Magloire
*Assistant Examiner* — Donald HB Braswell
(74) *Attorney, Agent, or Firm* — Hauptman Ham, LLP

(57) ABSTRACT

A mobile phone (mobile electronic device) includes an acceleration sensor that detects an acceleration, a communication module that performs communication, and a controller. When the number of steps based on the acceleration detected by the acceleration sensor has reached a first step count during an ON-state of the communication function of the communication module, the mobile phone shifts from a stop state to a walking state. The controller maintains the ON-state of the communication function of the communication module when the mobile phone shifts from the stop state to the walking state. The controller turns OFF the communication function of the communication module when the number of steps based on the acceleration has reached a second step count larger than the first step count.

15 Claims, 2 Drawing Sheets

(56) References Cited

U.S. PATENT DOCUMENTS

| | | | | |
|---|---|---|---|---|
| 2014/0153485 | A1* | 6/2014 | Tsuda | H04W 36/32 370/328 |
| 2015/0319708 | A1* | 11/2015 | Otonari | H04W 52/32 370/329 |
| 2015/0365806 | A1* | 12/2015 | Parviainen | G06F 3/0346 455/457 |

OTHER PUBLICATIONS

Koichi Nishimaki et al. "Estimation of remaining time to access indoor WIFI APs using acceleration sensors", Proceedings of the 2012 IEICE Communications Society Conference 1, Aug. 28, 2012 p. 495, previously submitted for consideration in an IDS filed with the USPTO.

* cited by examiner

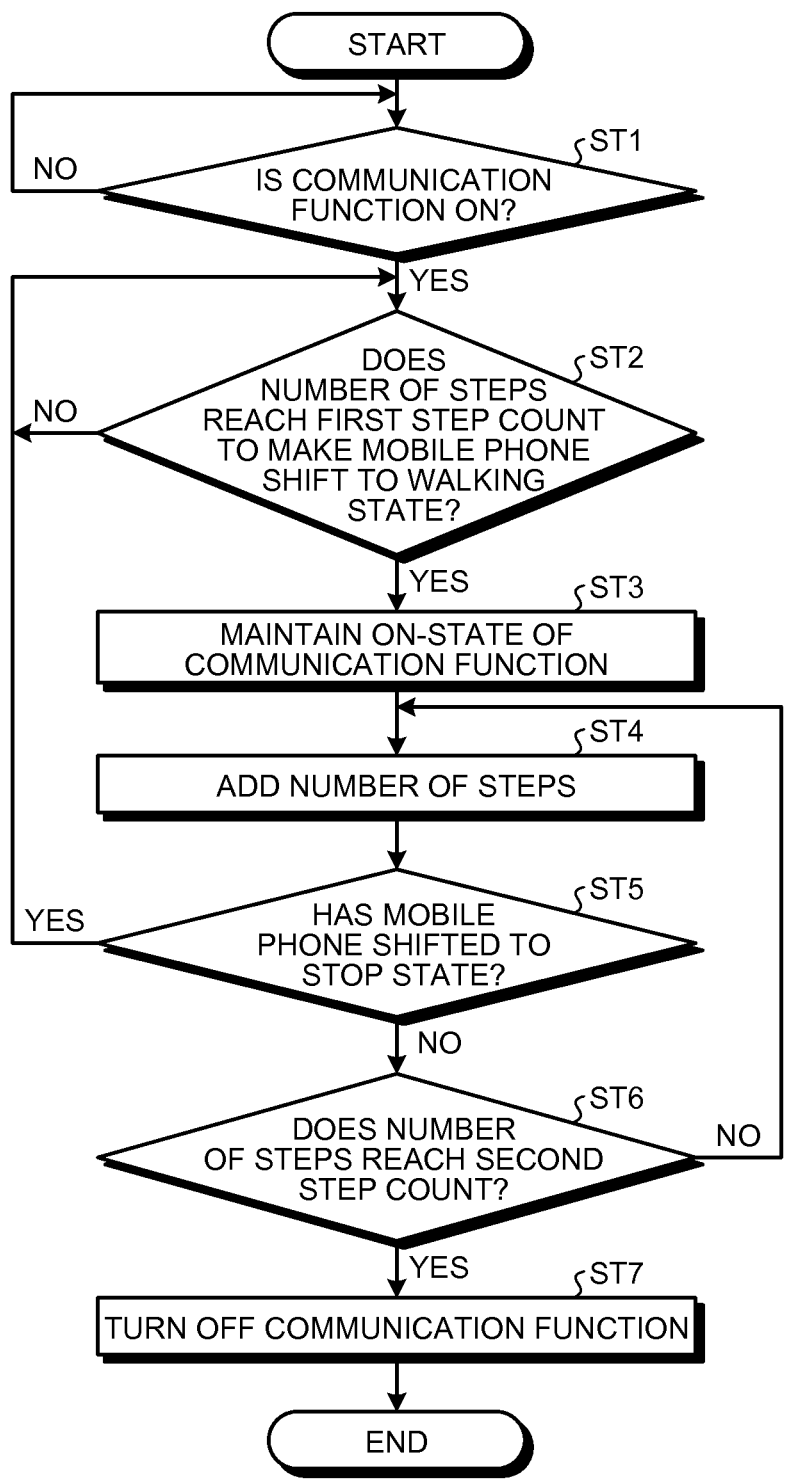

HANDOFF BETWEEN ACCESS POINTS FOR A MOBILE ELECTRONIC DEVICE BASED ON MOBILITY STATE

CROSS-REFERENCE TO RELATED APPLICATION

This application is a continuation of PCT international application Ser. No. PCT/JP2014/061602 filed on Apr. 24, 2014 which designates the United States, incorporated herein by reference, and which is based upon and claims the benefit of priority from Japanese Patent Application No. 2013-093788 filed on Apr. 26, 2013, the entire contents of which are incorporated herein by reference.

FIELD

The present disclosure relates to a communicable mobile electronic device.

BACKGROUND

There is known some mobile electronic devices that can communicate with other device according to some communication systems (see, for example, Japanese Patent Application Laid-open No. 2009-303234).

Some mobile electronic devices can communicate with other devices according to a wireless LAN system such as Wi-Fi (registered trademark). Generally, communication according to a wireless LAN system has advantages than a communication according to a communication standard for a cellular phone. On the other hand, the communication according to the wireless LAN system has advantages than the communication according to the communication standard for the cellular phone. Thus, a user of the mobile electronic device may readily enjoy communication using the wireless LAN system via an access point located nearby by turning ON a communication function of the wireless LAN system.

SUMMARY

A mobile electronic device according to an aspect comprises: an acceleration sensor configured to detect an acceleration; a communication module configured to perform communication; and a controller. The controller is configured to, during an ON-state of a communication function of the communication module, cause the mobile electronic device to shift from a stop state to a walking state when the number of steps based on the acceleration detected by the acceleration sensor has reached a first step count. The controller is configured to maintain the ON-state of the communication function of the communication module when the mobile electronic device is shifted from the stop state to the walking state. The controller is configured to turn OFF the communication function of the communication module when the number of steps based on the acceleration detected by the acceleration sensor has reached a second step count. The second step count is larger than the first step count.

The communication module of the mobile electronic device according to another aspect includes an access point communication module configured to perform communication via an access point. The mobile electronic device further comprises a base station communication module configured to perform communication via a base station. When the communication function of the access point communication module is turned OFF, the controller switches from communication using the access point communication module to communication using the base station communication module.

The communication module of the mobile electronic device according to another aspect includes a narrow-range wireless communication module configured to perform communication. The mobile electronic device further comprises a wide-range wireless communication module configured to perform communication. A range over which the narrow-range communication module can transmit/receive radio waves is narrower than a range over which the wide-range communication module can transmit/receive radio waves. When the communication function of the narrow-range communication module is turned OFF, the controller switches from communication using the narrow-range communication module to communication using the wide-range communication module.

The mobile electronic device according to another aspect further comprises a storage configured to store a total number of steps. When the number of steps based on the acceleration detected by the acceleration sensor has reached the first step count to cause the mobile electronic device to shift from the stop state to the walking state, the controller adds the number of steps to the total number of steps, and when the number of steps based on the acceleration detected by the acceleration sensor has not reached the first step count, the controller does not add the number of steps to the total number of steps.

The mobile electronic device according to another aspect further comprises an altitude sensor configured to detect an altitude. In a case where an altitude value detected by the altitude sensor has changed by a predetermined value or more, when the number of steps based on the acceleration detected by the acceleration sensor has reached a third step count smaller than the second step count, the controller turns OFF the communication function of the communication module.

A mobile electronic device according to another aspect comprises: an acceleration sensor configured to detect an acceleration; a direction sensor configured to detect a direction; a communication module configured to perform communication; and a controller configured to associate the number of steps based on the acceleration detected by the acceleration sensor with the direction detected by the direction sensor for each direction. When the number of steps associated with a given direction among the number of steps associated with each direction has reached a predetermined number of steps during an ON-state of a communication function of the communication module, the controller turns OFF the communication function of the communication module.

FIG. 2 is a flowchart illustrating operation of the mobile electronic device according to the embodiment of some embodiments.

DESCRIPTION OF EMBODIMENTS

Figure 1:
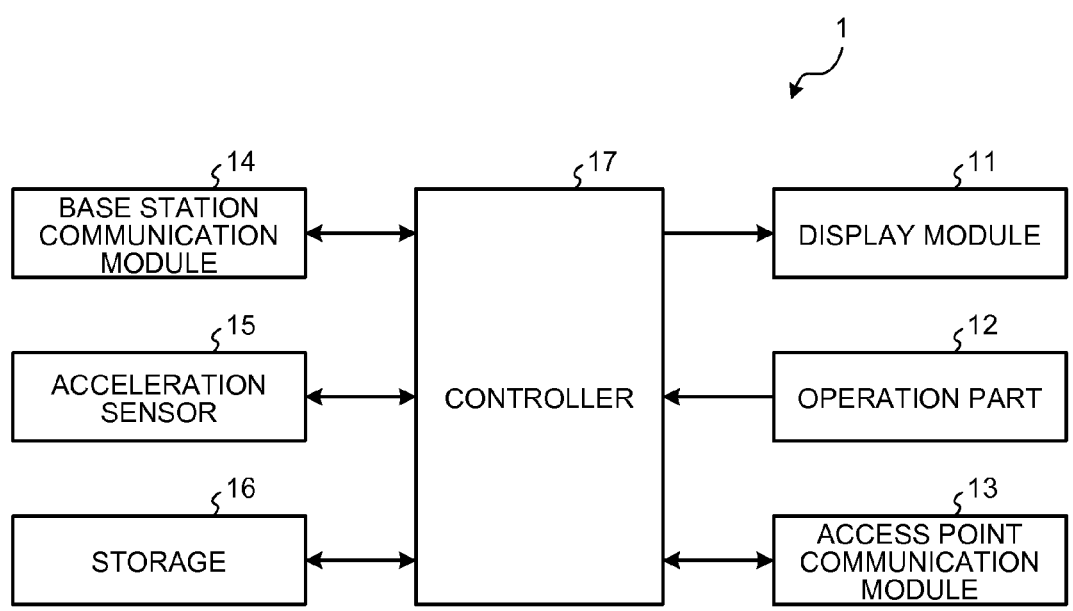
FIG. 1 is a block diagram illustrating a configuration of a mobile electronic device according to an embodiment of some embodiments.

Some embodiments for practicing the present disclosure will be described in detail with reference to the drawings. Hereinafter, a mobile phone 1 will be described as an example of a mobile electronic device.

As illustrated in FIG. 1, the mobile phone 1 includes a display module 11, an operation part 12, an access point communication module 13, a base station communication module 14, an acceleration sensor 15, a storage 16, and a controller 17. One of the access point communication module 13 and the base station communication module 14 may be called as a first communication module. And another one of the access point communication module 13 and the base station communication module 14 maybe called as a second communication module.

The display module 11 may include a display device. The display device may be a liquid crystal display, an electro-luminescence panel, or the like. The display module 11 is configured to display at least one of some objects. The objects include characters, images, symbols, graphics, or the like.

The operation part 12 may include at least one of buttons. A user can operate the mobile phone 1 via the operation part.

The access point communication module 13 may include at least one of antennas and at least one of RF circuit module. The access point communication module 13 may serve as a communication module or a narrow-range wireless communication module. The access point communication module 13 enables communication according to a wireless LAN system. The access point communication module 13 can communicate with another mobile phone via an access point. The access point may be a wireless LAN access point. The access point communication module 13 can communicate via the access point according to the wireless LAN system within a comparatively limited area than an area of the communication standard for a cellular phone. A range over which the access point communication module 13 can transmit/receive radio waves is narrower than a range over which the base station communication module 14 can transmit/receive radio waves. A coverage area of one access point is about 50 meter to 100 meter in radius. The "meter" is a measurement unit of a length. In some embodiments, the access point communication module 13 enables communication using a wireless LAN system conforming to IEEE 802.11, e.g., a Wi-Fi (registered trademark) wireless communication system.

The base station communication module 14 may include at least one of antennas and at least one of RF circuit modules. In some embodiments, the base station communication module 14 enables communication according to a communication standard for cellular phones. The base station communication module 14 may communicate with another mobile phone via a base station. A coverage area of one base station is about 2 kilo-meter in radius. A communication speed (which may be transmission rate) of communication performed by the base station communication module 14 may sometimes be lower than communication performed by the access point communication module 13.

The acceleration sensor 15 can detect an acceleration acting on the mobile phone 1. The acceleration may include one or more directions and one or more magnitudes. The acceleration sensor 15 can output a detecting data to the controller 17. In some embodiments, the acceleration sensor 15 may be of a 3G (three-dimensional) type that detects accelerations in X-, Y-, and Z-directions, respectively.

For example, the acceleration sensor 15 may be: a piezo-resistance type, an electrostatic capacitance type, a piezo-electric element (which may be called as a piezo-electric type), or a heat detection type MEMS (Micro Electro Mechanical Systems) sensor; a servo type that moves a movable coil and returns it to the original position by a feedback current; or a strain gauge type that measures distortion caused by acceleration using a strain gauge.

The storage 16 maybe used for arithmetic processing to be performed by the controller 17. The storage 16 may include a memory, a storage. The storage 16 may store one or more applications operating inside the mobile phone 1. The storage 16 may serve also as a detachable external memory. The storage 16 may store a first step count used for determining whether a stop state has shifted to a walking state. In some embodiments, the storage 16 may store, e.g., 10 steps as the first step count. The storage 16 may store a second step count used for turning OFF the communication function of the access point communication module 13. The second step count may be set larger than the first step count. The storage 16 may store, e.g., 50 steps as the second step count. The first step count and the second step count may be arbitrarily set by a user. The storage 16 may store a total number of steps detected based on the acceleration detected by the acceleration sensor 15. The storage 16 may stores a walk determination pattern used for determining a status of the mobile phone 1. The walk determination pattern may serve as a reference of an acceleration pattern detected when the user of the mobile phone 1 takes one step.

The controller 17 can control the mobile phone 1. The controller 17 may include, e.g., at least one of processors. One of the processor may be a central processing unit (CPU). The controller 17 may include, e.g., at least one of device drivers. Each of the device drivers can drive a device in the mobile phone 1. In some embodiment, a device in the mobile phone 1 may include the device drivers.

The controller 17 can determine a status of the mobile phone 1 based on the acceleration detected by the acceleration sensor 15. Upon determination of the status of the mobile phone 1, the controller 17 may use the walk determination pattern stored in the storage 16.

The controller 17 may compare an acceleration pattern based on the acceleration, detected within a predetermined time by the acceleration sensor 15, and the walk determination pattern. When an error between the acceleration pattern and the walk determination pattern falls within a predetermined marginal range, the controller 17 can determine that the user of the mobile phone 1 has taken one step. After determining that the user of the mobile phone 1 has taken one step, the controller 17 can continuously compare the acceleration pattern and walk determination pattern. That is, the controller 17 can repeat the determination on whether or not the user has taken more one step. When it is determined after the determination that the user of the mobile phone 1 has taken one step, that the error between the acceleration pattern and walk determination pattern falls within a predetermined range, the controller 17 determines that the user of the mobile phone 1 has continuously walked.

In an embodiment, the controller 17 can repeat above-described detection processing to detect the number of steps taken by the user of the mobile phone 1 in his or her continuous walking. When the detected number of steps taken by the user in his or her continuous walking has reached the first step count (which may be 10 steps) stored in the storage 16, the controller 17 cam determine that the mobile phone 1 has shifted from the stop state to the walking state. When it is determined that the mobile phone 1 has shifted from the stop state to the walking state, the controller 17 can add the first step count (which may be 10 steps) to the total number of steps stored in the storage 16. When the mobile phone 1 is in the walking state, the controller 17 can add one step to the total number of steps stored in the storage 16 every time it determines that the user of the mobile phone 1 has taken one step.

Before the number of steps taken by the user of the mobile phone 1 in his or her continuous walking reaches the first step count (which may be 10 steps) stored in the storage 16, the controller 17 can determine that the mobile phone 1 may be in the stop state. In a case where the mobile phone 1 is in the walking state, when the determination that the error between the acceleration pattern and walk determination pattern falls outside a predetermined range is continued for a predetermined time after the last time it is determined that the user of the mobile phone 1 has walked, the controller 17 can determine that the mobile phone 1 has shifted from the walking state to stop state.

When the number of steps taken by the user of the mobile phone 1 in his or her continuous walking does not reach the first step count (10 steps) stored in the storage 16, the controller 17 does not add the number of steps taken to the total number of steps stored in the storage 16. With the above processing, it is possible to reduce a possibility that the total number of steps stored in the storage 16 may be increased by an action different from the walking of the user of the mobile phone 1.

The walking state is, for example, a state where the total number of steps stored in the storage 16 is added as the user of the mobile phone 1 walks. In this walking state, when the total number of steps is displayed on the display module 11, it is possible to visually confirm that the number of steps newly detected is added to the total number of steps as the user of the mobile phone 1 walks.

The following describes a flow of operation of the mobile phone 1 with reference to a flowchart of FIG. 2. In the flowchart of FIG. 2, processing is started when the mobile phone 1 is in the stop state, for example, in a state where the user of the mobile phone 1 does not move but is stopped.

At step ST1, the controller 17 can determine whether or not the communication function of the access point communication module 13 is ON. A state where the communication function of the access point communication module 13 is ON is a state where the access point communication module 13 operates for performing communication. For example, the user of the mobile phone 1 can turn ON or OFF the communication function of the access point communication module 13 by operating the operation part 12. When it is determined at step ST1 that the communication function of the access point communication module 13 is not ON (step ST1, No), that is, when the communication function of the access point communication module 13 is OFF, the controller 17 repeats the processing of step ST1 until the communication function of the access point communication module 13 is turned ON.

When it is determined at step ST1 that the communication function of the access point communication module 13 is ON (step ST1, Yes), the controller 17 proceeds to step ST2. At step ST2, the controller 17 determines whether or not the mobile phone 1 has shifted from the stop state to the walking state. The controller 17 can compare the acceleration pattern and walk determination pattern and detects the number of steps taken by the user of the mobile phone 1 in his or her continuous walk. When the number of steps taken by the user of the mobile phone 1 in his or her continuous walking has reached the first step count (which may be 10 steps) stored in the storage 16, the controller 17 determines that the mobile phone 1 has shifted from the stop state to the walking state. When it is determined at step ST2 that the mobile phone 1 has not shifted from the stop state to the walking state (step ST2, No), the controller 17 repeats the processing of step ST2 until the mobile phone 1 shifts from the stop state to the walking state.

When it is determined at ST2 that the mobile phone 1 has shifted from the stop state to the walking state (step ST2, Yes), the controller 17 proceeds to ST3. At step ST3, the controller 17 maintains the ON-state of the communication function of the access point communication module 13.

After step ST3, at step ST4, the controller 17 adds the first step count (which may be 10 steps) to the total number of steps stored in the storage 16. When the mobile phone 1 is in the walking state, the controller 17 adds one step to the total number of steps stored in the storage 16 every time it determines that the user of the mobile phone 1 has taken one step. The controller 17 does not add the first step count to the total number of steps stored in the storage 16 until the processing shifts from step ST2 to step ST3.

After step ST4, at step ST5, the controller 17 determines whether or not the walking state has shifted to the stop state. When the determination that the error between the acceleration pattern and the walk determination pattern falls outside a predetermined range is continued for a predetermined time after the last time it is determined that the user of the mobile phone 1 has walked, the controller 17 determines that the mobile phone 1 has shifted from the walking state to the stop state. When it is determined that the mobile phone 1 has shifted from the walking state to the stop state (step ST5, Yes), the controller 17 proceeds to step ST2. When it is determined that the mobile phone 1 has not shifted from the walking state to stop state (step ST5, No), the controller 17 proceeds to step ST6.

At step ST6, the controller 17 can determine whether or not the number of steps determined to be taken by the user of the mobile phone 1 in his or her continuous walking has reached the second step count (which may be 50 steps) stored in the storage 16. When it is determined at step ST6 that the number of steps determined to be taken by the user of the mobile phone 1 in his or her continuous walking has not reached the second step count (which may be 50 steps) stored in the storage 16 (step ST6, No), the controller 17 proceeds to step ST4. When it is determined at step ST6 that the number of steps determined to be taken by the user of the mobile phone 1 in his or her continuous walking has reached the second step count (50 steps) stored in the storage 16 (step ST6, Yes), the controller 17 proceeds to step ST7. At step ST7, the controller 17 turns OFF the communication function of the access point communication module 13 and ends this flow.

As described above, according to an embodiment, the mobile phone 1 maintains the ON-state of the communication function of the access point communication module 13 when the number of steps detected based on the acceleration reaches the first step count to cause the stop state to shift to the walking state during the ON-state of the communication function of the access point communication module 13. When the number of steps detected based on the acceleration has reached the second step count larger than the first step count, the mobile phone 1 turns OFF the communication function of the access point communication module 13.

The mobile phone 1 does not turn OFF the communication when only it has shifted to the walking state, but turns OFF the communication function when the user of the mobile phone 1 further walks after the shifting to the walking state. In the mobile phone 1, the first step count used for determining whether the stop state has shifted to the walking state and second step count used for turning OFF the communication function are independent of each other. In the mobile phone 1, it is possible to reduce a possibility that a state where the actual status of the user and a status determined by the mobile electronic device differ from each other may be prolonged. In the mobile phone 1, it is possible to reduce a possibility that the stop state may shift to the walking state with a short walking to turn OFF the communication function.

Although some embodiments of the present disclosure has been described above, the present disclosure is not limited to above embodiments. The effects obtained by the present disclosure are not limited to those described in above embodiments.

In above embodiments, when the number of steps detected based on the acceleration has reached the second step count larger than the first step count, the mobile phone 1 turns OFF the communication function of the access point communication module 13. When the number of steps detected based on the acceleration has reached the second step count larger than the first step count, the mobile phone 1 may switch from communication using the access point communication module 13 (narrow-range wireless communication module) to communication using the base station communication module 14 (wide-range wireless communication module).

The mobile phone 1 may further have an altitude sensor and detect an altitude of the mobile phone 1 using the altitude sensor. The altitude sensor is constituted of, e.g., a pressure altimeter or a radio altimeter. In a case where the mobile phone 1 has the altitude sensor, when an altitude value detected by the altitude sensor has changed by a predetermined value or more, the number of steps based on which the communication function of the communication module is turned OFF may be changed. When the altitude value detected by the altitude sensor has changed by a predetermined value or more, the mobile phone 1 uses a third step count as a reference. The third step count is larger than the first step count and smaller than the second step count. For example, the third step count is set to 30 steps, which is larger than the first step count (10 steps) and smaller than the second step count (50 steps).

The change in the altitude value to be detected by the altitude sensor may be measured from, e.g., when it is determined that the stop state has shifted to the walking state or from when it is determined, based on the acceleration detected by the acceleration sensor 15 in the stop state and the walk determination pattern, that the user of the mobile phone 1 has taken one step. When the altitude value detected by the altitude sensor has changed by a predetermined value or more, the mobile phone 1 may switch from communication using the access point communication module 13 (narrow-range wireless communication module) to communication using the base station communication module 14 (wide-range wireless communication module).

The mobile phone 1 may further have a direction sensor that detects a direction (orientation). The direction sensor is constituted of, e.g., a geomagnetic sensor or a gyro sensor. In a case where the mobile phone 1 has the direction sensor, the controller 17 detects a direction using the direction sensor every time it is determined that he user of the mobile phone 1 has taken one step. The direction detected when one step of the user is detected is associated with the one step. For example, when the direction (360°) is equally divided into four sectors based on north, east, west, and south, the detected direction may be associated with one of the four sectors. When the number of steps of the user in his or her continuous walking associated with one of the sectors has reached a predetermined number of steps (e.g., 10 steps) during the ON-state of the communication function of the communication module, the mobile phone 1 may turn OFF the communication function of the communication module.

The invention claimed is:

1. A mobile electronic device, comprising:
   an acceleration sensor configured to detect an acceleration;
   a communication module configured to perform communication; and
   a controller
      configured to maintain an ON-state of a communication function of the communication module when a number of steps based on the acceleration detected by the acceleration sensor has reached a first step count to cause the mobile electronic device to shift from a stop state to a walking state during the ON-state of the communication function of the communication module, and
      configured to turn OFF the communication function of the communication module when the number of steps based on the acceleration detected by the acceleration sensor has reached a second step count larger than the first step count during the ON-state of the communication function of the communication module,
   wherein
      the communication module includes an access point communication module configured to perform communication via an access point,
      the mobile electronic device further comprises a base station communication module configured to perform communication via a base station, and
      when the communication function of the access point communication module is turned OFF, the controller switches from communication using the access point communication module to communication using the base station communication module.

2. The mobile electronic device according to claim 1, wherein
   the communication module includes a narrow-range wireless communication module configured to perform communication,
   the mobile electronic device further comprises a wide-range wireless communication module configured to perform communication,
   a range over which the narrow-range communication module can transmit/receive radio waves is narrower than a range over which the wide-range communication module can transmit/receive radio waves, and
   when the communication function of the narrow-range communication module is turned OFF, the controller switches from communication using the narrow-range communication module to communication using the wide-range communication module.

3. The mobile electronic device according to claim 1, further comprising a storage configured to store a total number of steps, wherein
   when the number of steps based on the acceleration detected by the acceleration sensor has reached the first step count to cause the mobile electronic device to shift from the stop state to the walking state, the controller adds the number of steps to the total number of steps, and
   when the number of steps based on the acceleration detected by the acceleration sensor has not reached the first step count, the controller does not add the number of steps to the total number of steps.

4. The mobile electronic device according to claim 1, further comprising an altitude sensor configured to detect an altitude, wherein
in a case where an altitude value detected by the altitude sensor has changed by a predetermined value or more, when the number of steps based on the acceleration detected by the acceleration sensor has reached a third step count smaller than the second step count, the controller turns OFF the communication function of the communication module.

5. A mobile electronic device, comprising:
an acceleration sensor configured to detect an acceleration;
a direction sensor configured to detect a direction;
a communication module configured to perform communication; and
a controller configured to associate a number of steps based on the acceleration detected by the acceleration sensor with the direction detected by the direction sensor for each direction,
wherein
when the number of steps associated with a given direction among the number of steps associated with each direction has reached a predetermined number of steps during an ON-state of a communication function of the communication module, the controller turns OFF the communication function of the communication module,
the communication module includes an access point communication module configured to perform communication via an access point,
the mobile electronic device further comprises a base station communication module configured to perform communication via a base station, and
when the communication function of the access point communication module is turned OFF, the controller switches from communication using the access point communication module to communication using the base station communication module.

6. The mobile electronic device according to claim 1, wherein the communication module includes one or more antennas.

7. The mobile electronic device according to claim 1, wherein the controller includes one or more processors.

8. The mobile electronic device according to claim 1, wherein the controller is configured to:
not detect shifting from the stop state to the walking state during an OFF-state of the communication function of the communication module, and
stop the detection of shifting from the stop state to the walking state, after the communication function of the communication module turns OFF by reaching the number of steps of the second step count.

9. The mobile electronic device according to claim 1, further comprising:
a storage configured to store the first step count and the second step count, wherein
an initial value of the first step count is 10 steps and an initial value of the second step count is 50 steps, and
the controller is configured to change the initial values of one or more of the first step count or the second step count based on a user input.

10. The mobile electronic device according to claim 9, wherein the storage is configured to be detached from the mobile electronic device.

11. The mobile electronic device according to claim 1, wherein the controller is configured to determine to shift from the stop state to the walking state based on a comparison of the acceleration detected by the acceleration sensor and a walk determination pattern.

12. The mobile electronic device according to claim 11, wherein the controller is configured to determine a user of the mobile electronic device continuously walks based on a determined error between a pattern of the detected acceleration and the walk determination pattern when the determined error is within a predetermined range and the determined error is detected within a predetermined period of time after a first step of the user.

13. The mobile electronic device according to claim 1, wherein the controller is configured to determine the mobile electronic device is in the stop state based on an absence of a next step of a user within a predetermined period of time after the mobile electronic device is in the walking state.

14. The mobile electronic device according to claim 1, further comprising:
a display module configured to display a total number of steps.

15. A mobile electronic device, comprising:
an acceleration sensor configured to detect an acceleration;
a communication module configured to perform communication;
an altitude sensor configured to detect an altitude; and
a controller
configured to maintain an ON-state of a communication function of the communication module when a number of steps based on the acceleration detected by the acceleration sensor has reached a first step count to cause the mobile electronic device to shift from a stop state to a walking state during the ON-state of the communication function of the communication module,
configured to turn OFF the communication function of the communication module when the number of steps based on the acceleration detected by the acceleration sensor has reached a second step count larger than the first step count during the ON-state of the communication function of the communication module, and
configured to turn OFF the communication function of the communication module when the number of steps based on the acceleration detected by the acceleration sensor has reached a third step count smaller than the second step count and an altitude value detected by the altitude sensor has changed by a predetermined value or more.

* * * * *

UNITED STATES PATENT AND TRADEMARK OFFICE
CERTIFICATE OF CORRECTION

PATENT NO. : 9,510,153 B2
APPLICATION NO. : 14/923375
DATED : November 29, 2016
INVENTOR(S) : Shigeki Tanabe, Hideki Morita and Isao Masuike It is certified that error appears in the above-identified patent and that said Letters Patent is hereby corrected as shown below:

On the Title Page

Item (56) References Cited, please insert:
-- FOREIGN PATENT DOCUMENTS --;
-- JP 2009-303234 A 12/2009 --;
-- JP 2010-4493 A 01/2010 --;
-- JP 2010-245825 A 10/2010 --.

OTHER PUBLICATIONS, please insert:
-- International Search Report and Written Opinion mailed August 5, 2014, corresponding to International patent application No. PCT/JP2014/061602 --.

Signed and Sealed this
Eighteenth Day of April, 2017

Michelle K. Lee
*Director of the United States Patent and Trademark Office*